Patented Jan. 9, 1951

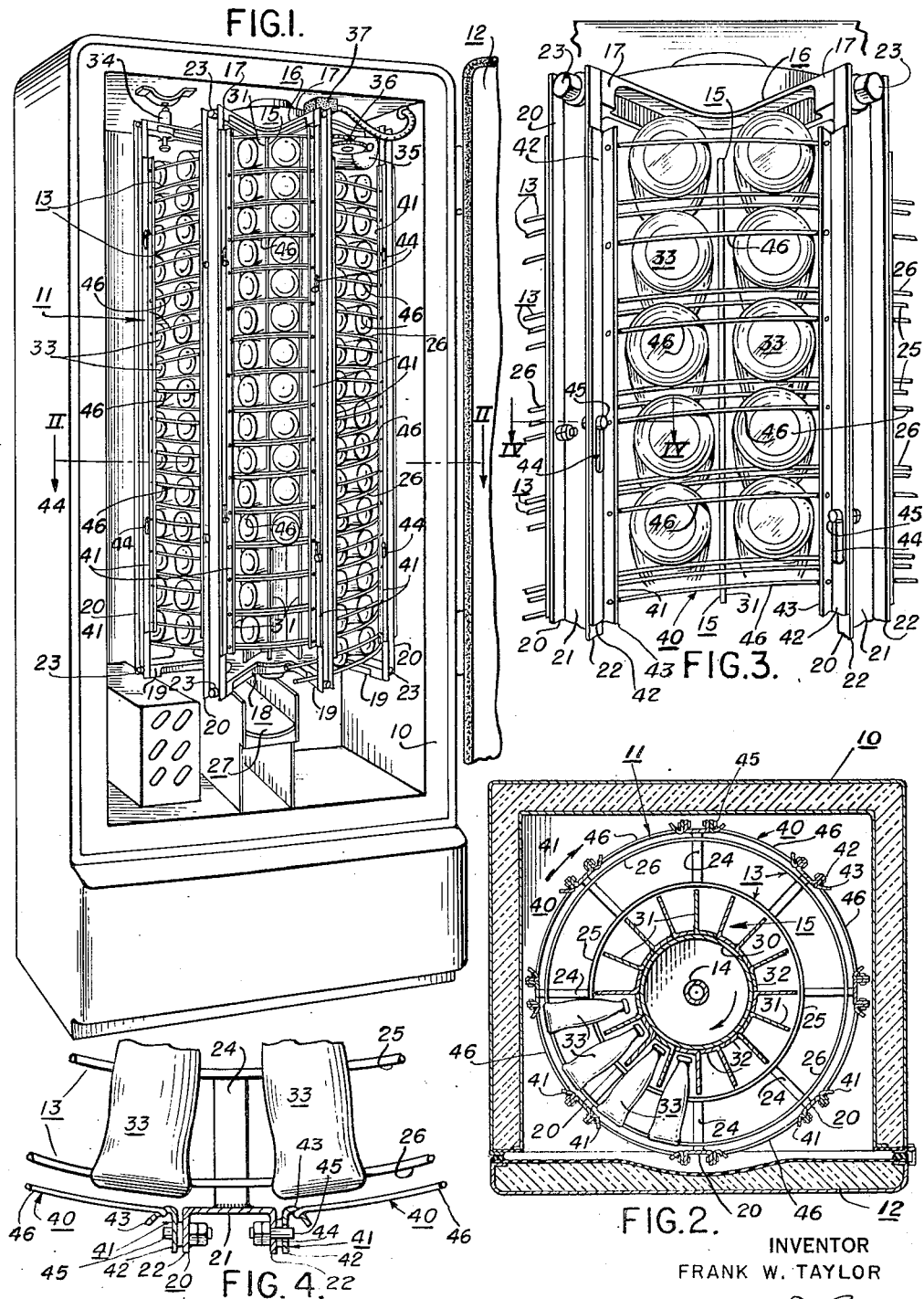

2,537,489

UNITED STATES PATENT OFFICE 2,537,489

VENDING APPARATUS

Frank W. Taylor, Springfield, Mass., assignor to Westinghouse Electric Corporation, East Pittsburgh, Pa., a corporation of Pennsylvania Application July 30, 1949, Serial No. 107,759

3 Claims. (Cl. 312—97.1)

This invention relates to a dispensing apparatus and particularly to an apparatus for dispensing generally cylindrical objects such as bottles.

The invention is particularly applicable to a dispensing apparatus of the type where the bottles are disposed horizontally in a vertically stacked arrangement and the individual bottles are successively moved to the bottom of the dispensing structure from which they are separately dispensed.

More particularly, the invention is applicable to a dispensing mechanism of the aforesaid type in which the bottles are supported on their sides on a circular spiral ramp and are moved downwardly on the ramp by means of a rotatable pusher member centrally disposed inside the ramp.

In such a construction the necks of the bottles extend inwardly into contact with the pusher member. When a bottle is to be dispensed, the ramp being stationary, the pusher member is actuated either manually or by a motor through a sufficient number of degrees of rotation to cause one bottle to fall off the bottom of the ramp into a discharge opening. During this dispensing operation, all the bottles are rolled along the ramp by the action of pusher member on the necks of the bottles. If one or more of the bottles is not well aligned on the ramp or if it moves in an irregular path, it may ride off the ramp at its outer end and cause jamming of the dispensing mechanism. This is particularly true when at least a portion of the structure of the ramp is in the form of a cage through which the bottles may be loaded into the dispensing mechanism.

An object of the invention, therefore, is to provide a guard structure for the open portion of the ramp, which structure is attached to the ramp but is readily movable relative thereto to afford easy access to the ramp for loading purposes.

A further object is to provide a guard structure or gate which is vertically movable relative to the ramp when a bottle is inserted in its dispensing position on the ramp, but which will automatically return to its normal position when the inserted bottle has been properly located.

These and other objects are effected by my invention as will be apparent from the following description and claims taken in connection with the accompanying drawings, forming a part of this application, in which:

Fig. 1 is a front perspective view of a dispensing cabinet with the door open and having a dispensing mechanism therein provided with the guard or gate feature;

Fig. 2 is a horizontal section taken on line II—II of Fig. 1;

Fig. 3 is a front elevation on an enlarged scale with respect to Figs. 1 and 2, showing in detail the ramp and guard assembly; and Fig. 4 is a plan view showing a fragmentary portion of the ramp and guard assembly.

In the drawings, 10 denotes an insulated cabinet in which the dispensing mechanism 11 is placed. The vertical front opening is normally closed by a door 12.

The dispensing mechanism includes a circular spiral ramp 13 rotatably mounted on a fixed vertical shaft 14 and a pusher member 15 also rotatably mounted with respect to the shaft 14 and disposed inside the ramp 13.

The ramp is here shown as supported between an upper spider 16 having horizontally and radially projecting arms 17, and a lower spider 18 having horizontally and radially projecting arms 19. The opposite pairs of upper and lower arms 17 and 19 are joined by vertical posts 20 comprising channel-shaped members having a central web 21 and outwardly-extending flanges 22. The extremities of the posts 20 are fastened to the ends of arms 17 and 19 as by bolts 23.

Horizontal strap supporting members 24 are provided at regularly spaced intervals along each vertical post 20 and are secured thereto by suitable means such as welding. These straps serve as supports for a pair of spirally-wound tracks 25 and 26 which serve as the ramp on which the cylindrical articles, such as bottles, to be dispensed are supported. These tracks are here shown as wire members and are rigidly attached to the horizontal straps as by welding. The lower ends of the tracks 25 and 26 terminate adjacent a chute 27 into which the successive bottles drop as the pusher member 15 is rotated step by step. From the chute the bottles are retrieved by the customer through an opening (not shown) in the door 12.

The pusher member 15 comprises a cylindrical shell 30 extending the full height of the ramp and rotatably supported by upper and lower bearings (not shown) on the shaft 14. Radial blades 31 extend at spaced intervals from the shell 30 and are fastened thereto by flanges 32. The space between two adjacent blades 31 receives the neck of a bottle 33, and the bottle itself is horizontally supported on the spiral tracks 25 and 26.

In the dispensing operation the ramp is held stationary by a latch 34 adjacent the top of the ramp and cabinet. The pusher member 15 is rotated a predetermined number of degrees sufficient to cause one bottle to drop off the ramp onto the chute 27. The pusher member may be rotated manually, or as here shown, by an electric motor 35 attached to the upper end of the ramp and driving the pusher member through suitable gearing 36.

When the unit is to be reloaded, the latch 34 may be released and the electric plug 37 detached so that the ramp and the pusher member may be rotated in unison to bring the various sections of the cage in front of the operator, or the pusher member may be operated separately, as in the dispensing operation, to bring the blades 31 successively before the operator. In the latter case, should any bottles remain in the machine they will be dropped onto the chute as the pusher is rotated and can be replaced higher up on the ramp by the operator.

In a structure as herein described, there is a tendency for the bottles to ride outwardly off the edge of the ramp as they are moved by the pusher member. This is particularly true as the necks of the bottles are not firmly gripped between the blades 31 but are held loosely enough so that they may roll down the ramp. To prevent the bottles so riding a guard member 40 is provided between each pair of vertical posts 20. This guard member comprises a pair of V-shaped supports 41 each having a flange 42 closely adjacent and parallel to the flange 22 of post 20 and a flange 43 bent away from the flange 42. Each flange 42 is provided with one or more vertical slots 44 for receiving a pin 45 fixed to the flange 22 of post 20. In practice, at least two of these pin-and-slot connections are provided for each cooperating pair of flanges 22 and 42. Suitable wires 46 extend between and are attached to the flanges 43 of adjacent pairs of supports 41 which lie between adjacent vertical posts 20. These wires are so spaced that when the guard assembly is in its normal position (Figs. 1 and 3) they lie approximately half-way between each pair of wires 26 forming the outer track of the ramp. In this position they so guide the outer ends of the bottles that they cannot drop off or move outwardly from the ramp. The slots 44 are made long enough so that when a bottle is inserted neck first between a track 26 on which the bottle is to rest and the wire 46 above that portion of the track, the entire guard structure will raise sufficiently high to permit the bottle to be pushed into dispensing position, resting on the tracks 25 and 26 with its neck between adjacent flanges of the pusher member 15. When a bottle has been so positioned, the guard structure returns to its normal position by gravity.

It will be apparent from the foregoing description that the invention provides a simple and effective structure which positively retains the bottles on the ramp and yet which is releasable merely by the insertion of a bottle to permit the bottle to be placed in the dispensing mechanism without any particular attention on the part of the operator.

While I have shown the invention in but one form, it will be obvious to those skilled in the art that it is not so limited, but is susceptible of various changes and modifications without departing from the spirit thereof.

What I claim is:

1. Apparatus for dispensing articles separately, said apparatus comprising a generally cylindrical structure through which the articles are moved toward one end thereof at which end they are dispensed, said structure having at least one portion thereof open along its periphery for substantially the entire length of the structure for the insertion and removal of the articles and movable guard means supported by the cylindrical structure and normally closing the open portion thereof, said means being movable parallel to the axis of the cylindrical structure to afford access to the structure for the insertion in the structure of articles to be dispensed.

2. Apparatus according to claim 1 in which the cylindrical structure is mounted on a vertical axis and in which the movable guard means is raised vertically when an article is inserted into the structure at the open portion thereof and in which the guard means returns to its normal position by gravity when the article has been properly positioned within the structure.

3. Structure according to claim 2, in which the movable guard means is reciprocably mounted for limited movement at the periphery of the cylindrical dispensing structure.

FRANK W. TAYLOR.

No references cited.